United States Patent
Niida et al.

(10) Patent No.: US 6,607,279 B2
(45) Date of Patent: Aug. 19, 2003

(54) LIGHT GUIDING PLATE

(75) Inventors: Eiki Niida, Kariya (JP); Fumikazu Isogai, Kariya (JP); Yasuya Mita, Kariya (JP); Norihito Takeuchi, Kariya (JP); Tomoyoshi Motohiro, Aichi (JP); Tatsuo Fukano, Aichi (JP); Yasuhiko Takeda, Aichi (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 11 days.

(21) Appl. No.: 09/954,336

(22) Filed: Sep. 17, 2001

(65) Prior Publication Data
US 2002/0057561 A1 May 16, 2002

(30) Foreign Application Priority Data

Sep. 18, 2000 (JP) ........................................ 2000-281959
Sep. 28, 2000 (JP) ........................................ 2000-297205

(51) Int. Cl.[7] .............................................. G01D 11/28
(52) U.S. Cl. .............................. 362/26; 362/31; 349/63
(58) Field of Search .............................. 362/26, 27, 31; 349/63

(56) References Cited

FOREIGN PATENT DOCUMENTS

| JP | 2-165504 | 6/1990 | .............. F21V/8/00 |
| JP | 10-339815 | 12/1998 | .............. G02B/6/00 |
| JP | 11-218757 | 8/1999 | ......... G02F/1/1335 |

*Primary Examiner*—Stephen Husar
(74) *Attorney, Agent, or Firm*—Morgan & Finnegan, LLP

(57) ABSTRACT

A light guiding plate guides light from a light source to illuminate a liquid crystal cell. A reflector reflects light from the light source. A first surface and a second surface selectively transmits or reflects light. A first region is formed on the first surface at a location that is relatively near the light source. The first region includes a first inclined face and a second inclined face. The first inclined face reflects light from the light source to guide light to the reflector. The second inclined face reflects light from the light source to the second surface so that the second surface emits light. A second region is formed on the first surface at a location that is relatively far from the light source. The second region includes a third inclined face and a fourth inclined face. The third inclined face reflects light from the light source to the second surface so that the second surface emits light. The fourth inclined face reflects light reflected by the reflector to the second surface so that the second surface emits light.

14 Claims, 12 Drawing Sheets

LIGHT GUIDING PLATE

BACKGROUND OF THE INVENTION

The present invention relates to a light guiding plate for guiding light from a light source to illuminate a liquid crystal cell.

Generally, a liquid crystal display has a light guiding plate to guide beams of light from a light source and radiate the light onto the entire surface of the cell. The light guiding plate is, for example, located on the observer's side of a reflective liquid crystal cell and functions as a front light, which radiate light onto the observer's side.

FIGS. 14(A) and 14(B) show a prior art light guiding plate 9, and FIGS. 15(A) and 15(B) show a prior art light guiding plate 90. A light source 2 is located at a side of each light guiding plate 9, 90. Beams 4 of light emitted from the light source 2 are introduced into the guiding plates 9, 90. When specific conditions are satisfied, the beams 4 are transmitted by a first surface 93 of the plate 9, 90. After being transmitted by the first surface 93, the beams 4 are radiated onto a liquid crystal cell 3 through a flat second surface 92, which faces the cell 3.

As shown in FIG. 14(A), the first surface 93 of the plate 9 has a saw-tooth cross section and grooves 95. Each groove 95 is defined by an inclined face 951 of a first group and an inclined face 952 of a second group. Each first inclined face 951 reflects the beams 4 from the light source 2 and guides the beams 4 toward a side 99 of the plate 9 that is located at opposite side to the light source 2. Each second inclined face 952 reflects the beams 4 from the light source 2 and toward the second surface 92 so that the second surface 92 emits the beams 4.

The beams 4 in the guiding plate 9 propagate through the guiding plate 9 while being reflected at the second surface 92 and the first inclined faces 95. During the propagation, the beams 4 are reflected by the second inclined faces 952 and are transmitted by the second surface 92. Then, the beams 4 are radiated onto the cell 3.

The beam 4 is totally guided by one of the first inclined faces 951 along a direction away from the light source 2 with a changed propagation angle. Therefore, the beam 4 is also radiated onto the cell 3 at a location that is relatively far from the light source 2.

The propagation angle refers to the angle defined by the second surface 92 and the vector of a propagating beam.

In the light guiding plate 90, which is shown in FIGS. 15(A) and 15(B), V-shaped grooves 96 are formed on the first surface 93. Also, a reflector 91 is located at the side that is opposite to the light source 2.

Each groove 96 has an inclined face 962 of a first group and an inclined face 961 of a second group. Each first inclined face 962 reflects the beams 4 from the light source 2 and to the second surface 92 so that the second surface 92 emits the beams 4. Each second inclined face 961 reflects beams 41 of light that have been reflected by the reflector 91 to the second surface 92 so that the second surface 92 emits the beams 4.

Each part of the first surface 93 where there is no groove 96 is flat and is referred to a flat face 963.

The beams 4 in the guiding plate 90 propagate through the guiding plate 90 while being reflected by the second surface 92 and the flat faces 963. During the propagation, the beams 4 are reflected by the first inclined faces 962 or the second inclined faces 961 and are transmitted by the second surface 92. Then, the beams 4 are radiated onto the cell 3.

The light guiding plate 9 shown in FIGS. 14(A) and 14(B) does not have a reflector at the side 99 opposite to the light source 2. Therefore, some of the light that reaches the side 99 passes through the side 99. As a result, the light that has passed through the side 99 cannot be radiated onto the cell 3. Therefore, the intensity of light from the light guiding plate 9 is insufficient for the flat panel light source.

The plate 9 has no reflector because, unlike the plate 90, no surfaces that reflect beams from the side 99 and guide the beams to the cell 3 are formed on the first surface 93. That is, even if there were a reflector, beams reflected by the reflector would not be guided to be transmitted by the second surface 92.

The guiding plate 90 of the FIGS. 15(A) and 15(B) has the reflector 91 and the second inclined faces 961. The second inclined faces 961 reflect the beams 41, which have been reflected by the reflector 91, to the second surface 92. Therefore relatively less light is wasted.

However, in the area that is relatively far from the light source 2, the intensity of light that passes through the second surface 92 is relatively weak, which causes uneven brightness.

The reason for the uneven brightness is considered to be as follows.

The beams 4 that enter the plate 90 have substantially even propagation angles. Also, after being reflected by the first and second inclined faces 962, 961, the beams 4, 41 are transmitted by the second surface 92 only when the propagation angles of the beams 4, 41 satisfy a limited condition of propagation angle. Therefore, more beams 4 which propagation angles satisfy the condition exit the plate 90 at an area relatively close to the light source 2. This reduces the amount of beams 4 that reach areas far from the light source 2. Accordingly, the brightness is uneven.

SUMMARY OF THE INVENTION

Accordingly, it is an objective of the present invention to provide a light guiding plate that has a sufficient and even brightness.

To achieve the above objective, the present invention provides a light guiding plate for guiding light from a light source to illuminate a liquid crystal cell. The light guiding plate comprises a reflector located on an opposite side of the plate from the light source. The reflector reflects light from the light source. A first surface selectively transmits or reflects light. A second surface, which is flat, is located between the cell and the first surface. The second surface selectively transmits or reflects light. A first region is formed on the first surface at a location that is relatively near the light source. The first region includes a first inclined face and a second inclined face. The first inclined face reflects light from light source to guide light to the reflector. The second inclined face reflects light from the light source to the second surface so that the second surface emits light. A second region is formed on the first surface at a location that is relatively far from the light source. The second region includes a third inclined face and a fourth inclined face. The third inclined face reflects light from the light source to the second surface so that the second surface emits light. The fourth inclined face reflects light reflected by the reflector to the second surface so that the second surface emits light.

The present invention also provides a light guiding plate for guiding light from a light source to illuminate a liquid crystal cell. The light guiding plate comprises a reflector located on an opposite side of the plate from the light source. The reflector reflects light from the light source. A first surface selectively transmits or reflects light. A second surface, which is flat, is located between the cell and the first surface. The second surface selectively transmits or reflects light. A plurality of recesses are located on the first surface at predetermined intervals. Each recess includes a first inclined face and a second inclined face. The first inclined face reflects light from the light source to the second surface so that the second surface emits light. The second inclined face reflects light reflected by the reflector to the second surface so that the second surface emits light. A plurality of third inclined faces are located on the first surface. Each third inclined face is located between a pair of adjacent recesses and is inclined relative to the second surface.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1–4.

Figure 1:
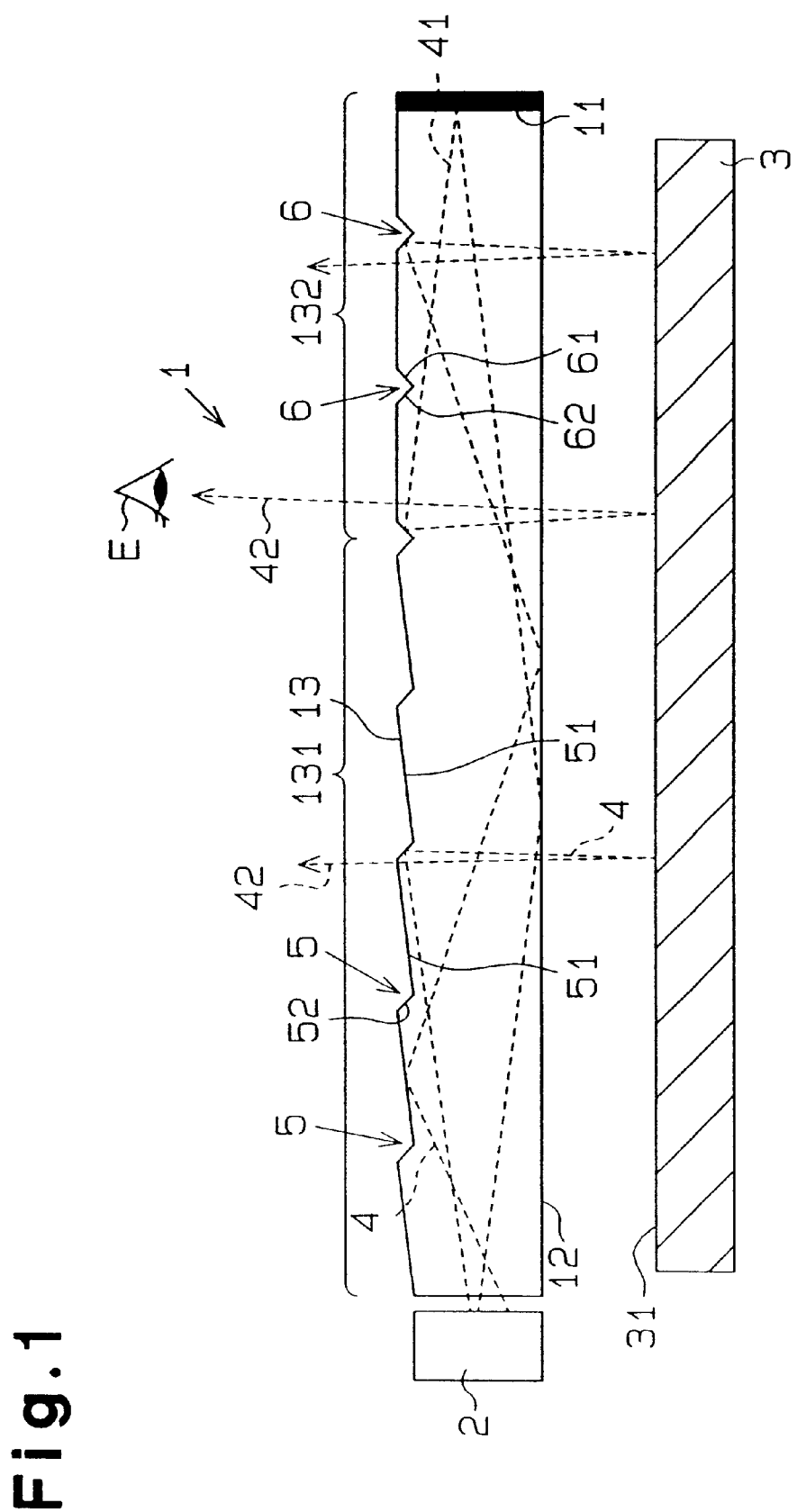
FIG. 1 is a cross-sectional view illustrating a light guiding plate according to a first embodiment of the present invention.

As shown in FIG. 1, a light guiding plate 1, which has a substantially even thickness, has an upper first surface 13 and a lower second surface 12. The first surface 13 and the second surface 12 reflect or transmit the beams 4 of light depending on the propagation angles of the beams 4. A light source 2 is located at one side of the guiding plate 1. Beams 4 of light emitted from the light source 2 are guided to a lit object, which is a liquid crystal cell 3 in this embodiment. The guiding plate 1 also has a reflector 11, which is located opposite to the light source 2, as shown. The reflector 11 reflects the beams 4 toward the light source 2.

Figure 2:
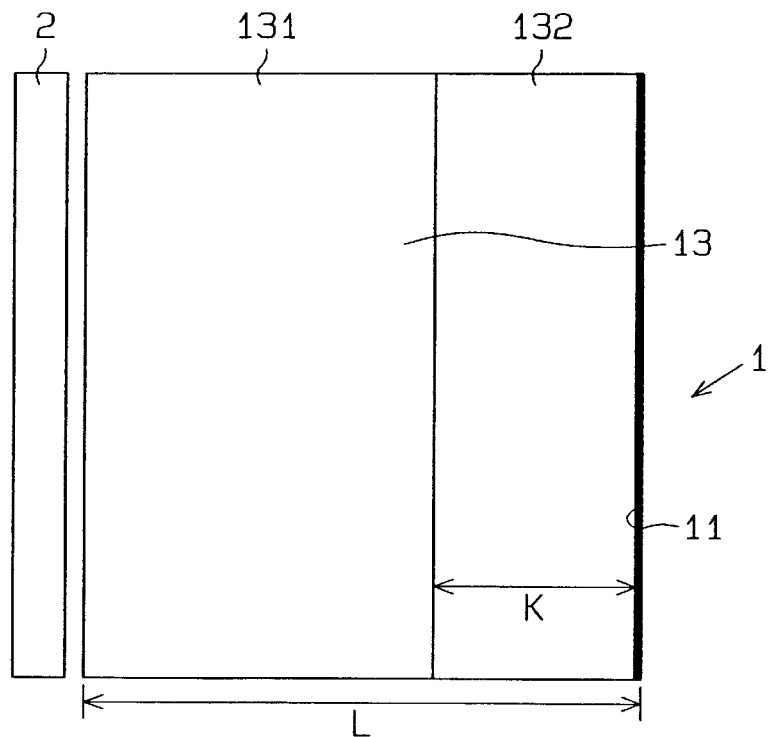
FIG. 2 is a plan view of the light guiding plate shown in FIG. 1.

As shown in FIGS. 1 and 2, a first region 131 and a second region 132 are formed on the first surface 13. The cross-sectional shape of the first region 131 is different from that of the second region 132.

The first region 131 includes first inclined faces 51 and second inclined faces 52. Each first inclined face 51 totally reflects the beams 4 from the light source 2. The first inclined faces 51 guide the light to the reflector 11 while changing the propagation angles of the beams 4. The second inclined faces 52 reflect the beams 4 to the second surface 12 so that the second surface 12 emits the beams 4.

The second region 132 includes a third group of inclined faces 62 and a fourth group of inclined faces 61. Each third inclined face 62 reflects the beams 4 from the light source 2 and to the second surface 12 so that the second surface 12 emits the beams 4. Each fourth inclined face 61 reflects the beams 41 that have been reflected by the reflector 11 and to the second surface 12 so that the second surface 12 emits the beams 4.

The light source 2 is a linear light source, the length of which is substantially equal to the corresponding side of the light guiding plate 1. As long as the beams 4 are emitted from the entire length of the light source 2, the light source 2 may be any type. For example, a cold-cathode tube may be used as the light source 2. Alternatively, a rod-like light guiding body that has a point light source such as light-emitting diode (LED) at one or two end may be used. Such a light guiding body conducts light at one of the ends from the LEDs and functions as a linear light source.

Figure 3A:
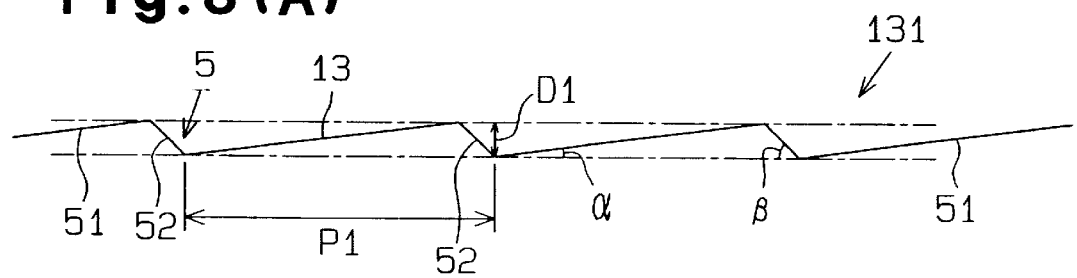
FIG. 3(A) is a partial cross-sectional view illustrating grooves of a first group formed on the light guiding plate shown in FIG. 1.

As shown in FIG. 3(A), the first region 131 includes a first group of grooves 5, each of which has a saw-tooth cross-section. Each first groove 5 is defined by one of the first inclined faces 51 and the corresponding second inclined face 52. The inclination angle $\alpha$ of each first inclined face 51 relative to the second surface 12 is approximately two degrees. The inclination angle $\beta$ of each second inclined face 52 relative to the second surface 12 is approximately forty-four degrees.

As shown in FIG. 1, each first inclined face 51 is inclined such that the distance between the first surface 13 and the second surface 12 increases toward the reflector 11 Each second inclined face 52 is inclined such that the distance between the first surface 13 and the second surface 12 decreases toward the reflector 11.

Figure 3B:
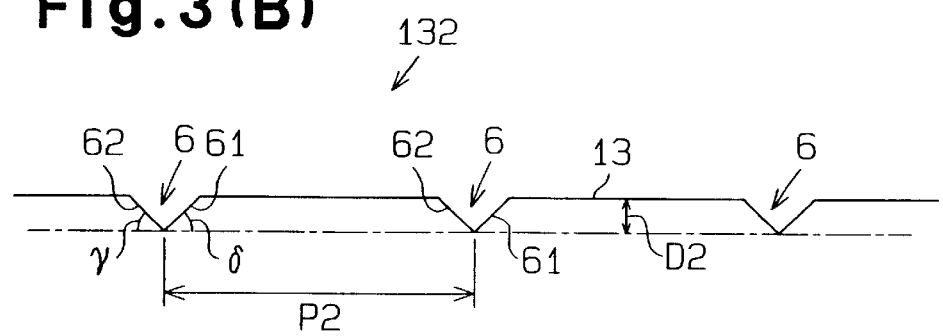
FIG. 3(B) is a partial cross-sectional view illustrating grooves of a second group formed on the light guiding plate shown in FIG. 1.

As shown in FIG. 3(B), the region 132 has a second group of grooves 6, each of which has a V-shaped cross-section. Each second groove 6 is defined by one of the third inclined faces 62 and the corresponding fourth inclined face 61. The inclination angle γ of each third inclined face 62 relative to the second surface 12 is approximately forty-six degrees. The inclination angle δ of each inclined face 61 is approximately forty-six degrees.

As shown in FIG. 1, each fourth inclined face 61 is inclined such that the distance between the first surface 13 and the second surface 12 increases toward the reflector 11. Each third inclined face 62 is inclined such that the distance between the first surface 13 and the second surface 12 decreases toward the reflector 11.

As shown in FIG. 3(A), the depth D1 of each first groove 5 is approximately 6 μm. The distance P1 between the neighboring one of the first grooves 5 is 200 μm. As shown in FIG. 3(B), the depth D2 of each second groove 6 is 7 μm. The distance P2 between the neighboring one of the second grooves 6 is 200 μm.

The light guiding plate 1 is made of an acrylic sheet, the thickness of which is 1 mm. The reflector 11 is formed by evaporating silver onto a side of the acrylic sheet.

As shown in FIG. 1, the light guiding plate 1 functions as front light and faces the observer's side 31 of the liquid crystal cell 3, which is a reflective type one.

That is, some of the beams 4 that are transmitted by the light guiding plate 1 to the cell 3 are radiated onto the observer's side 31. Beams 42 that are reflected by the observer's side 31 are transmitted by the light guiding plate 1 and reaches the eye E of an observer. The cell 3 is made visible in this manner.

The first embodiment has the following advantages.

The first inclined faces 51 are formed on the first region 131 of the light guiding plate 1. The first inclined faces 51 change the angles of the beams 4 and guide a sufficient intensity of light to the area that is far from the light source 2. Further, some of the beams 4 from the light source 2 are reflected by the second inclined faces 52 of the first region 131 or by the third inclined faces 62 of the second region 132. That is, the beams 4 from the light source 2 are reflected by the second inclined faces 52 or by the third inclined faces 62 and are transmitted by the second surface 12. At any distance from the light source 2, a sufficient intensity of light is irritated onto the cell 3.

The fourth inclined faces 61 are formed on the second region 132 of the light guiding plate 1. Therefore, the beams 41 that have been reflected by the reflector 11 are reflected by the fourth inclined face 61. That is, the beams 41 from the reflector 11 are reflected by the fourth inclined face 61 and are transmitted by the second surface 12.

In this manner, the beams 41 that are reflected by the reflector 11 also reach the cell 3. Therefore, in a region that is relatively far from the light source 2, a sufficient intensity of light reaches the cell 3.

In this manner, the beams 41 that are reflected by the reflector 11 are also guided to the display 3. Therefore, in a region that is relatively far from the light source 2, a sufficient amount of light is guided to the display 3.

The beams 4 of light emitted from the light source 2 into the guiding plate 1 are evenly radiated from the entire area of the second surface 12. Therefore, the light guiding plate 1 functions as a flat panel light source that emits even light with a sufficient brightness.

The first grooves 5 and the second grooves 6, which are formed on the first surface 13, permit the beams 4 to be more efficiently radiated onto the cell 3 compared to the prior art light guiding plates 9, 90 shown in FIGS. 14(A)–15(B). That is, the inclination angles of the inclined faces 51, 52, 62, 61 permit the beams 4, which are emitted from the light source 2, to be propagated toward the reflector 11 and to be guided to the second surface 12 more efficiently compared to the light guiding plate 9, 90 shown in FIGS. 14(A)–15(B). The light guiding plate 1 of the first embodiment guides the beams 41 reflected by the reflector 11 to the second surface 12 more efficiently compared to the guiding plate 9, 90 shown in FIGS. 14(A)–15(B).

Figure 4:
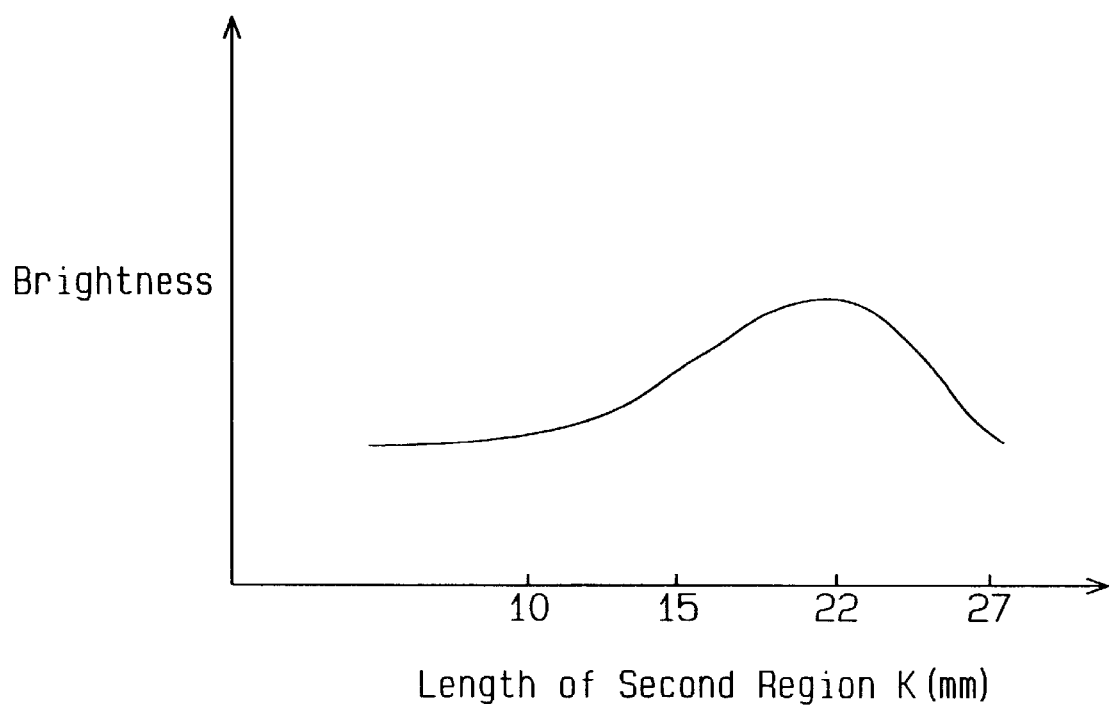
FIG. 4 is a graph showing the brightness of the light guiding plate shown in FIGS. 1–3(B) according to the length of a second region.

The graph of FIG. 4 shows the result of measurement of changes in the brightness of the light guiding plate 1 with varying the length of the second region 132.

Specifically, the length L, which is measured from the side of the first region 131 to the reflector 11, was set to 62 mm. The length K of the second region 132 was varied in a range of 10–27 mm and the brightness of the plate 1 was measured at various lengths.

As shown in FIG. 4, the brightness of the light guiding plate 1 is the strongest when the length K of the second region 132 is 22 mm.

Therefore, if the length L between the side of the first region 131 and the reflector 11 is 62 mm, setting the length K of the second region 132 to 22 mm optimizes the ratio of the first region 131 to the second region 132. That is, in this case, the propagation and the radiation of the beams 4 are optimized and the brightness of the light guiding plate 1 is maximized.

A light guiding plate 10 according to a second embodiment of the present invention will now be described with reference to FIGS. 5 and 6. In the second embodiment, the first surface 13 is divided into three regions. Specifically, the first surface 13 is divided into a first region 131, which is closest to the light source 2, a second region 132, which is closest to the reflector 11, and a third region 133, which is between the first region 131 and the second region 132.

The cross-sectional shapes of the first and second regions 131, 132 are the same as those of the embodiment shown in FIGS. 1–3(D). That is, the first region 131 has the first grooves 5 and the second region 132 has the second grooves 6.

Figure 6:
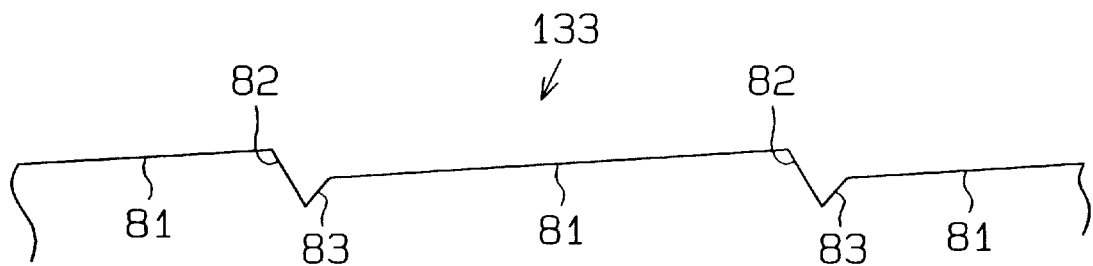
FIG. 6 is a partial enlarged cross sectional view of a third group of FIG. 5.

As shown in FIG. 6, the third region 133 includes fifth inclined faces 81, sixth inclined faces 82 and seventh inclined faces 83, which are continuously formed. The third region 133 is formed as a combination of the first grooves 5 and the second grooves 6 of FIG. 1. The fifth inclined faces 81 reflect light from the light source 2 to guide light to the reflector 11. The sixth inclined faces 82 reflect light from the light source 2 to the second surface 12 so that the second surface 12 emits the beams 4. The seventh inclined faces 83 reflect light reflected by the reflector 11 to the second surface 12 so that the second surface 12 emits the beams 4.

Other structure of the light guiding plate of FIG. 6 is the same as that shown in FIGS. 1–3(D).

Figure 5:
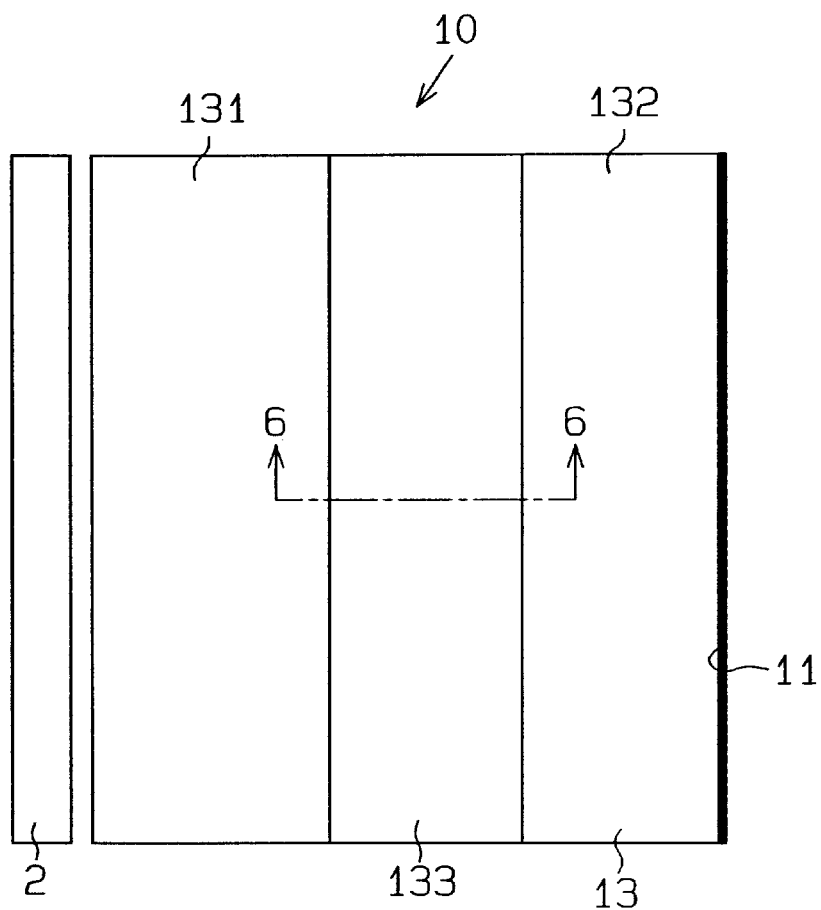
FIG. 5 is plain view illustrating a light guiding plate according to a second embodiment.

In the embodiment of FIGS. 5 and 6, the beams 4 of light are efficiently propagated and radiated as in the embodiment of FIGS. 1–3(B). Thus, the plate 10 has a strong and even brightness.

A light guiding plate 100 according to a third embodiment will now be described with reference to FIG. 7. Instead of the second grooves 6 of FIG. 1, the plate 100 has cone-shaped recesses 7 in the second region 132. The diameter d of the basal plane of the recess 7 is approximately 22 μm. The height h of the recess 7 is approximately 10 μm. The recesses 7 are formed on the first surface 13 of the plate 100. The number of the recesses 7 in a square centimeter is approximately one hundred and fifty.

A part of each recess 7 that faces the light source 2 is a first inclined face 72, and a part that faces the reflector 11 is a second inclined face 71. Each first inclined face 72 reflects the beams 4 emitted from the light source 2 to the second surface 12 so that the second surface 12 emits the beams 4. The second inclined face 71 reflects the beams 41 reflected by the reflector 11 to the second surface 12 so that the second surface 12 emits the beams 4.

The other structure of the light guiding plate 100 of FIG. 6 is the same as that shown in FIGS. 1–3 (B).

Figure 7:
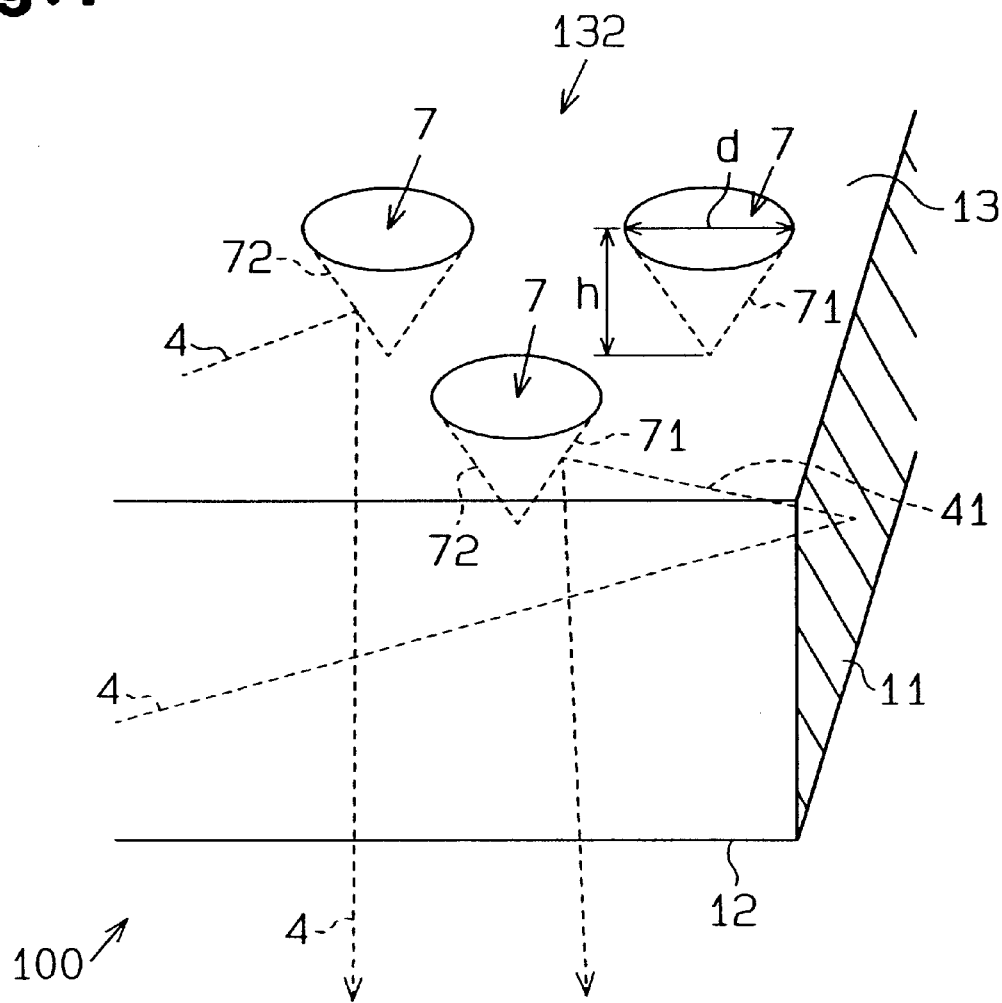
FIG. 7 is a partial perspective view illustrating a second area of a light guiding plate according to a third embodiment of the present invention.

In the embodiment of FIG. 7, the beams 4, 41 that reach the second region 132 are reflected by the first inclined face 72 and the second inclined face 71 of each recess 7, respectively. The reflected beams 4, 41 reach the second surface 12 as in the embodiment of FIGS. 1–3(B). Therefore, the guiding plate 100 has the same advantages as the embodiment of FIGS. 1–3(B).

Figure 8:
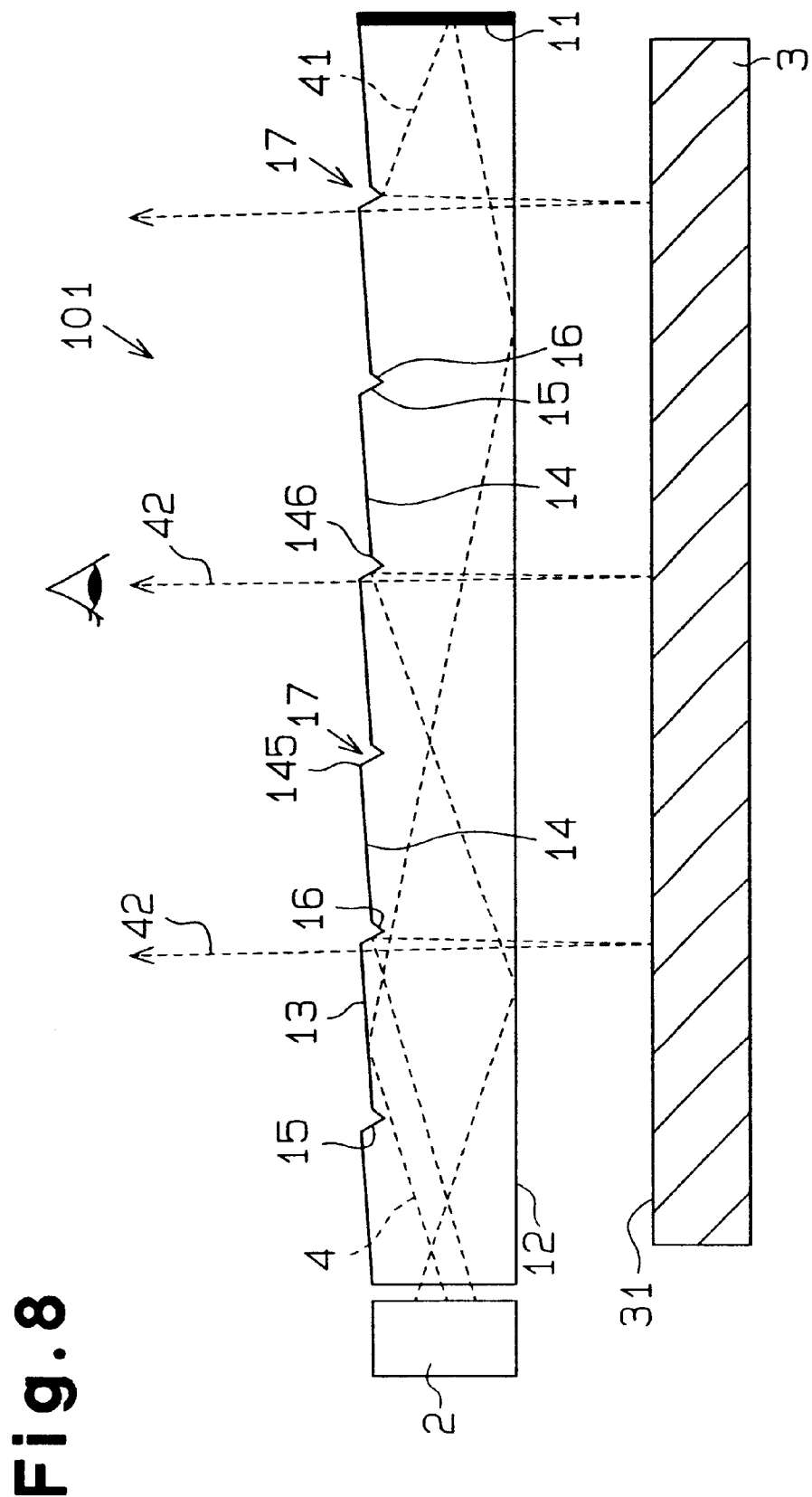
FIG. 8 is a cross-sectional view illustrating a light guiding plate according to a fourth embodiment of the present invention.

A light guiding plate 101 according to a fourth embodiment will now be described with reference to FIGS. 8–10. The light guiding plate 101 is different from the light guiding plate 1 of FIGS. 1–3(B) in the shape of the first surface 13. The other structure of the light guiding plate of FIG. 8 is the same as that shown in FIGS. 1–3(B). Like or the same reference numerals are given to those components that are like or the same as the corresponding components of the embodiment of FIG. 1–3(D).

Recesses 17 are formed at predetermined intervals on the first surface 13 of the guiding plate 101. Each recess 17 has a first inclined face 15 and a second inclined face 16. The first inclined face 15 reflects the beams 4 from the light source 2 and to the second surface 12 so that the second surface 12 emits the beams 4. The second inclined face 16 reflects the beams 4 reflected by the reflector 11 and to the second surface 12 so that the second surface 12 emits the beams 4. A third inclined face 14 is formed between each adjacent pair of recesses 17. Each third inclined face 14 is inclined relative to the second surface 12 by a predetermined angle The joint 145 between each first inclined face 15 and the corresponding third inclined face 14 is farther from the second surface 12 than the joint 146 between the third inclined face 14 and the second inclined face 16.

Each third inclined face 14 is inclined such that the distance between the first surface 13 and the second surface 12 increases toward the reflector 11.

Figure 9:
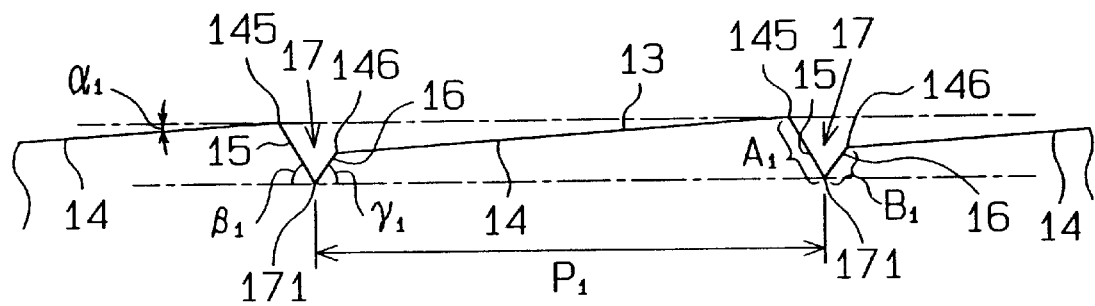
FIG. 9 is a partial cross-sectional view showing the grooves formed on the light guiding plate shown in FIG. 8.

As shown in FIG. 9, the angle $\alpha_1$ of each third inclined face 14 relative to the second surface 12 is approximately two degrees. The angle $\beta_1$ of each first inclined face 15 relative to the second surface 12 is approximately forty-six degrees. The angle $\gamma_1$ of each second inclined face 16 relative to the second surface 12 is approximately fifty degrees.

The length of each first inclined face 15, that is, the distance A1 between the bottom 171 of each recess 17 and the corresponding first joint 145, is approximately 7 $\mu$m. The length of each second inclined face 16, that is, the distance B1 between the bottom 171 of each recess 17 and the second joint 146, is approximately 2 $\mu$m.

Broken lines in FIG. 9 are parallel to the second surface 12.

Each recess 17 is defined by the corresponding first and second inclined faces 15, 16 and has a V-shaped cross section. The distance P1 between the neighboring one of the recesses 17 is approximately 200 $\mu$m.

Figure 10:
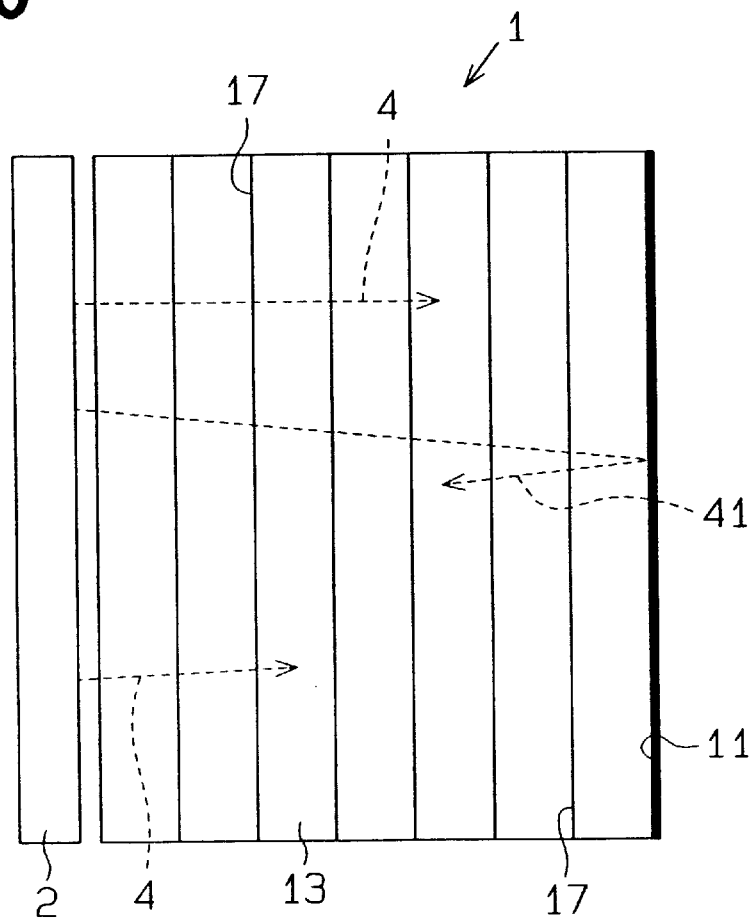
FIG. 10 is a plan view illustrating the light guiding plate shown in FIG. 8.

As shown in FIG. 10, the recesses 17 extend parallel to the side at which the light source 2 is located and to the side at which the reflector is approximately 1 mm.

The light guiding plate 101 is formed of an acrylic sheet the thickness of which is approximately 1 mm.

The embodiment of FIGS. 8–10 has the following advantages.

The light guiding plate 101 has the third inclined faces 14. Therefore, a sufficient amount of the beams 4 emitted from the light source 2 reach regions far from the light source 2 while changing the propagation angles. In other words, a sufficient amount of beams 4 are transmitted by an area of the second surface 12 that is far from the light source 2.

When the beams 4 emitted from the light source 2 propagate in the guiding plate 101, each first inclined face 15 reflects some of the beams 4 and guides them to the second surface 12.

The guiding plate 101 includes the reflector 11 and the second inclined faces 16. As shown in FIG. 8, each second inclined face 16 reflects the beams 41 reflected by the reflector 11 and radiates the beams 41 to the cell 3 through the second surface 12.

Therefore, the beams 41 are radiated to the cell 3, which increases the brightness of the plate 101.

The guiding plate 101 has the third inclined faces 14 and the second inclined faces 16. Thus, sufficient amount of beams 4 is guided to areas far from the light source 2. Also, the beams 41, which are reflected by the reflector 11, are reliably guided to the second surface 12.

Therefore, the beams 4 introduced into the guiding plate 101 are radiated from the entire second surface 12. Thus, the guiding plate 101 has a sufficient and even brightness.

The guiding plate 101 has a generally even thickness from the light source 2 to the reflector 11. Therefore, the thickness of the guiding plate 101 can be reduced, which permits the product using the plate 101 to be thinner.

The distance between the second surface 12 and each first joint 145 is longer than the distance between the second surface 12 and each second joint 146. After being totally reflected by each third inclined face 14, the propagation angle of the beams 4 is decreased. Therefore, sufficient amount of beams 4 from the light source 2 reaches areas far from the light source 2.

Some of the beams 4, the propagation angle of which is suitable for being radiated from the second surface 12, are totally reflected by each third inclined face 14. The propagation angles of the beams 4 are changed, accordingly. This reduces the amount of beams 4 that are radiated from areas close to the light source 2 and guides more of the beams 4 to areas far from the light source 2.

Therefore, parts of the guiding plate 101 that are far from the light source 2 have a sufficient brightness.

A light guiding plate 301 according to a sixth embodiment will also be described with reference to FIG. 11(B). The guiding plate 301 includes recesses 17. The distance of the recesses 17 decreases as the distance from the light source 2 increases. The other structure of the light guiding plate 301 of FIG. 11(B) is the same as that shown in FIGS. 8–10.

A light guiding plate 301 according to a sixth embodiment will also be described with reference to FIG. 11(B). The guiding plate 301 includes recesses 17. The distance of the recesses 17 decreases as the distance from the light source 2 increases. The other structure of the light guiding plate 301 of FIG. 11(B) is the same as that shown in FIGS. 8–10.

In addition to the advantages of the embodiment of FIGS. 8–10, the fifth and sixth embodiments have the following advantages. That is, in the guiding plates shown in FIGS. 11(A) and 11(B), a larger amount of beams 4 are radiated from areas far from the light source 2. Therefore, the brightness at areas far from the light source 2 is increased.

A light guiding plate 401 according to a seventh embodiment will now be described with reference to FIGS. 12 and 13. The seventh embodiment is different from the embodiment of FIG. 9 in that each third inclined face 14 is inclined such that the distance between the first surface 13 and the second surface 12 decreases toward the reflector 11. Further, the first joints 145 are closer to the second surface 12 than the second joints 146.

Figure 13:
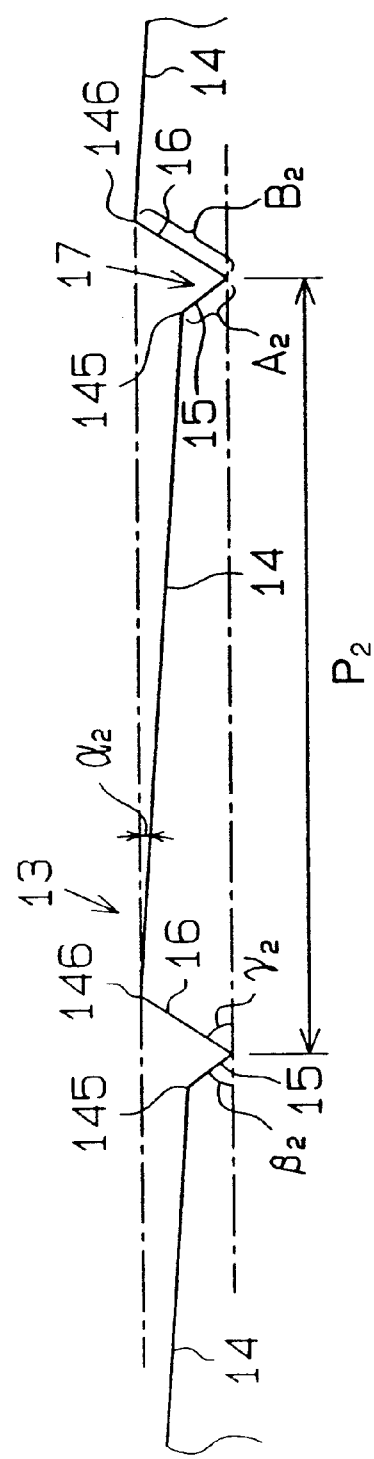
FIG. 13 is a partial cross-sectional view illustrating the light guiding plate shown in FIG. 12.
Figure 14A:
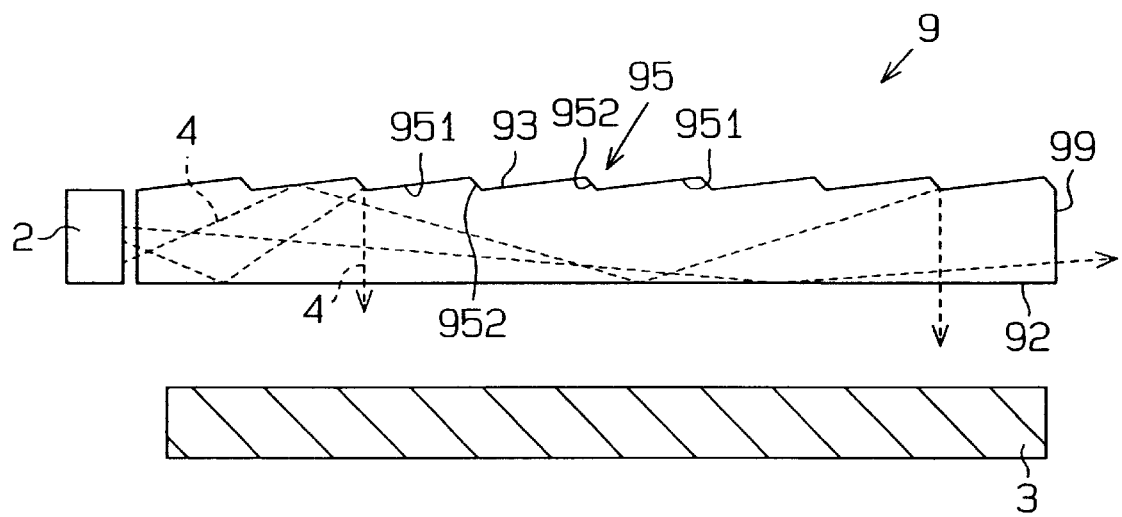
FIG. 14(A) is a cross-sectional view illustrating a prior art light guiding plate.
Figure 14B:
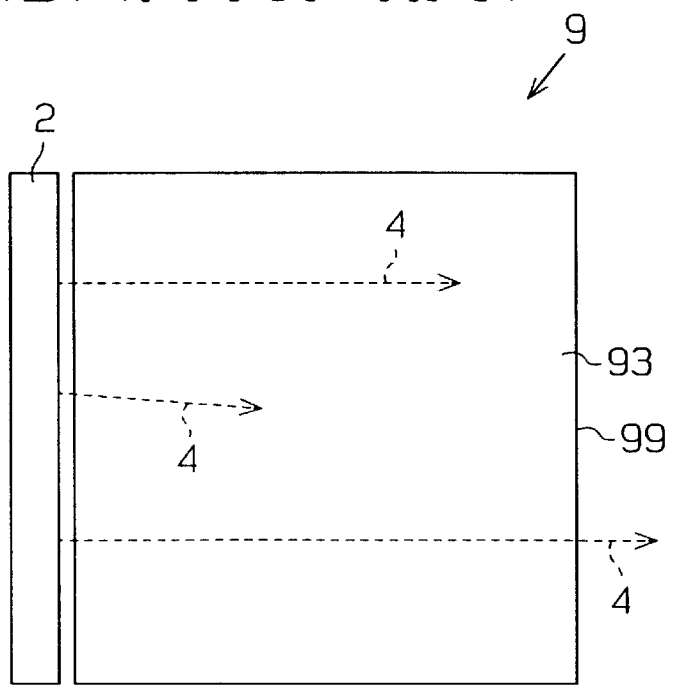
FIG. 14(B) is a plan view showing the light guiding plate shown in FIG. 14(A)
Figure 15A:
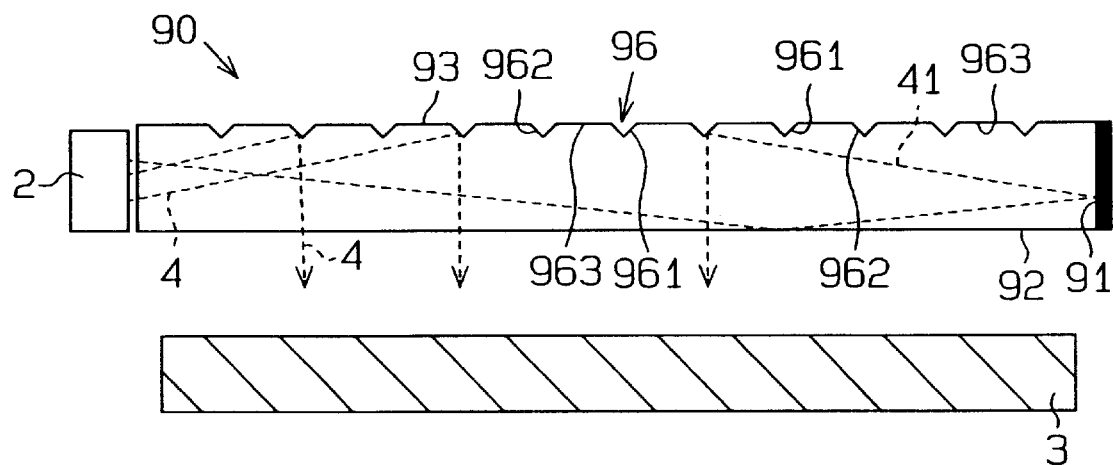
FIG. 15(A) is a cross-sectional view illustrating another prior art light guiding plate.
Figure 15B:
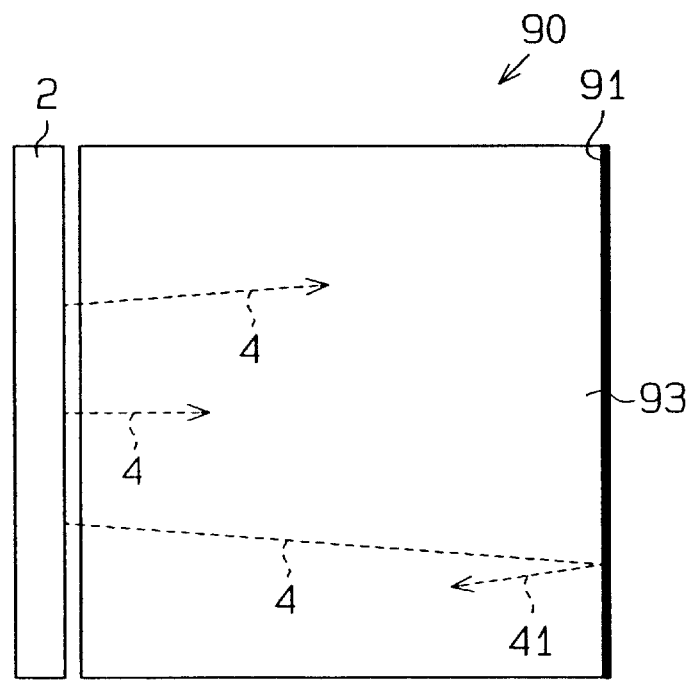
FIG. 15(B) is a plan view showing the light guiding plate shown in FIG. 15(A).

As shown in FIG. 13, the inclination angle $\alpha_2$ of the third inclined face 14 relative to the second surface 12 is approximately two degrees. The inclination angle $\beta_2$ of the first inclined face 15 relative to the second surface 12 is approximately forty-four degrees. The inclination angle $\gamma_2$ of the second inclined face 16 relative to the second surface 12 is approximately forty-four degrees.

The length of each first inclined face 15, that is, the distance A2 between the bottom 171 of each recess and the corresponding joint 145, is approximately 3 µm. The length of each second inclined face 16, that is, the distance B2 between the bottom 171 of each recess 17 and the corresponding second joint 146, is approximately 7 µm. The distance P2 of the recesses 17 is approximately 200 µm. Broken lines in FIG. 13 are parallel to the second surface 12.

The other structure of the light guiding plate 301 of FIG. 11(B) is the same as that shown in FIG. 8

Figure 12:
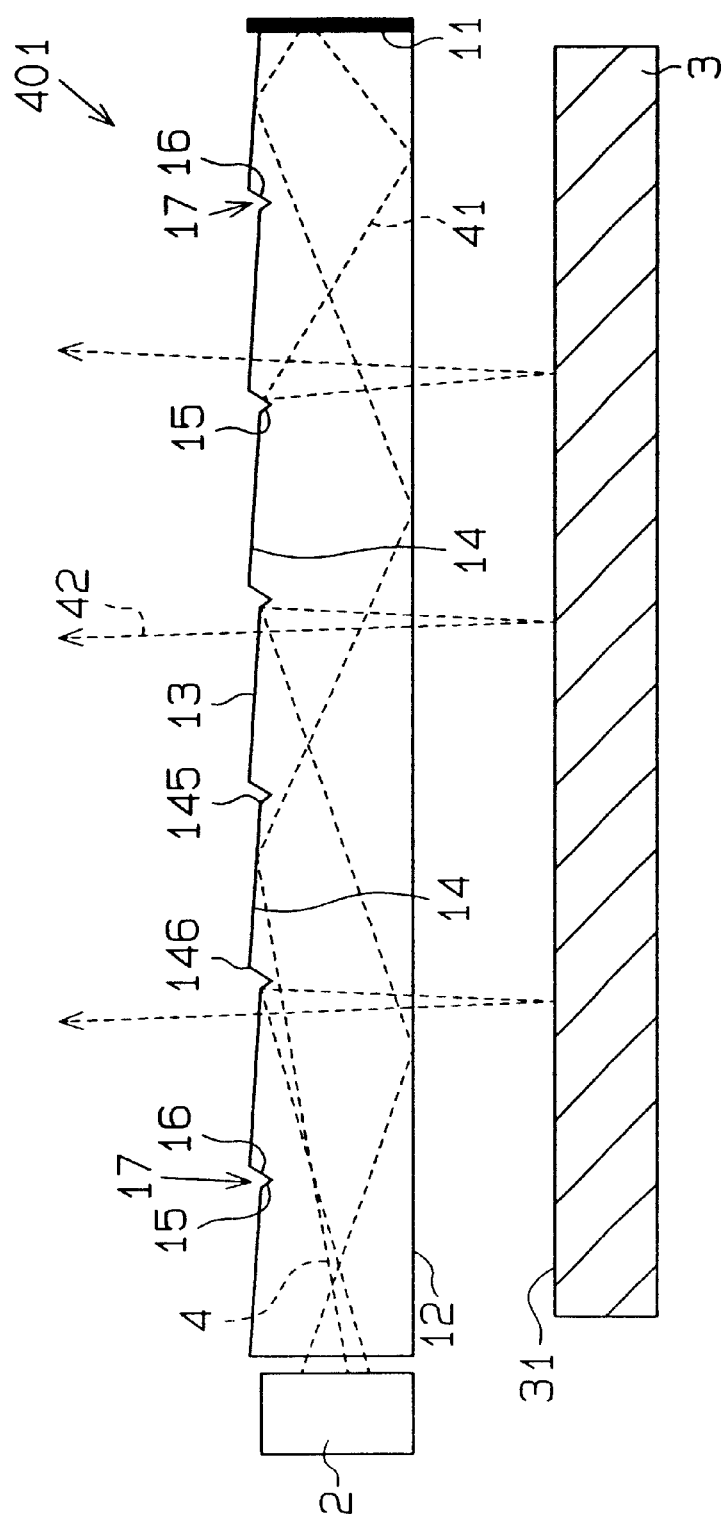
FIG. 12 is a cross-sectional view illustrating a light guiding plate according to a seventh embodiment of the present invention.

In addition to the advantages of the embodiment shown in FIGS. 8–10, the embodiment of FIGS. 12 and 13 has the following advantages.

The area of each second inclined face 16 of the guiding plate 401 is relatively large. Thus, the beams 41 that are reflected by the reflector 11 and reach the first surface 13 are reliably reflected by each second inclined face 16 and are guided to the second surface 12.

If the propagation angle of the beams 4 is not suitable for being radiated from the second surface 12, the beams 4 are totally reflected by the third inclined faces 14 and the propagation angle is changed, which guides the beams 4 to an area of the second surface 12 that is far from the light source 2. Thus, the brightness of the area that is far from the light source 2 is increased.

In the embodiments of FIGS. 8–13, the parameters defining the shapes of the recesses 17 and the third inclined faces 14, such as the distances P1, P2, the inclination angles $\alpha_1$, $\beta_1$, $\gamma_1$, $\alpha_2$, $\beta_2$, $\gamma_2$, the lengths $A_1$, $B_1$, $A_2$, $B_2$ of the first and second inclined faces 15, 16 (see FIGS. 9 and 13), may be adjusted to further increase the brightness and reduce the unevenness of the brightness.

In the embodiment of FIG. 7, the parameters may be changed to increase the brightness and reduce the unevenness of the brightness.

In the embodiments of FIGS. 1–7, the parameters defining the first and second grooves 5 and 6, or the depth D1, D2, the distances P1, P2, the inclination angles $\alpha$, $\beta$, $\gamma$, $\delta$ (see FIGS. 3(A) and 3(B)) may be adjusted for an increase of the brightness and a reduction of the unevenness of the brightness.

In the embodiment of FIG. 8–13, a flat surface that is parallel to the second surface 12 may be formed between each third inclined face 14 and the corresponding first inclined face 15.

The light guiding plates 1, 10, 100, 101, 201, 301, 401 may be used for lit objects other than the liquid crystal cell 3. For example, the plates 1, 10, 100, 101, 201, 301, 401 may be used for lighting negatives of photographs.

The light guiding plates 1, 10, 100, 101, 201, 301, 401 may be located at the opposite side from the observer's side of the cell 3 and function as a backlight.

The shape of each first groove 5 of FIG. 1 may be changed. For example, a surface that is parallel to the second surface 12 may be formed between the first inclined face 51 and the second inclined face 52 of each first groove 5.

In the light guiding plate 1 shown in FIG. 1, a flat surface between each adjacent pair of second grooves 6 may be omitted. That is, the second grooves 6 may be continuously formed.

Therefore, the present examples and embodiments are to be considered as illustrative and not restrictive and the invention is not to be limited to the details given herein, but may be modified within the scope and equivalence of the appended claims.

What is claimed is:

1. A light guiding plate for guiding light from a light source to illuminate a liquid crystal cell, the light guiding plate comprising:
    a reflector located on an opposite side of the plate from the light source, wherein the reflector reflects light from the light source;
    a first surface for selectively transmitting or reflecting light;
    a second surface, which is flat, located between the cell and the first surface, wherein the second surface selectively transmits or reflects light;
    a first region, which is formed on the first surface at a location that is relatively near the light source, the first region including:
        a first inclined face for reflecting light from the light source to guide light to the reflector; and
        a second inclined face for reflecting light from the light source to the second surface so that the second surface emits light; and
    a second region, which is formed on the first surface at a location that is relatively far from the light source, the second region including:
        a third inclined face for reflecting light from the light source to the second so that the second surface emits light; and
        a fourth inclined face for reflecting light reflected by the reflector to the second surface so that the second surface emits light.

2. The light guiding plate according to claim 1, wherein the first region has a groove, which has a saw-tooth cross-section, wherein the groove is defined by the first inclined face and the second inclined face, wherein the first inclined face is inclined such that the distance between the first inclined face and the second surface increase toward the reflector.

3. The light guiding plate according to claim 2, wherein the range of the angle of the first inclined face to the second surface is one to three degrees.

4. The light guiding plate according to claim 2, wherein the range of the angle of the second inclined face to the second surface is forty to sixty degrees.

5. The light guiding plate according to claim 1, wherein the second region has a groove, which has a V-shape cross-section, wherein the groove is defined by the third inclined face and the fourth inclined face, wherein the third inclined face is inclined such that the distance between the third inclined face and the second surface decreases toward the reflector.

6. The light guiding plate according to claim 5, wherein the range of the angle of the third inclined face to the second surface is forty to sixty degrees.

7. The light guiding plate according to claim 1, wherein the range of the angle of the fourth inclined face to the second surface is forty to sixty degrees.

8. The light guiding plate according to claim 1, wherein the first surface has a third region, which is located between the first and second regions, wherein the third region includes:
- a fifth inclined face for reflecting light from the light source to guide light to the reflector;
- a sixth inclined face for reflecting light from the light source to the second surface so that the second surface emits light; and
- a seventh inclined face for reflecting light reflected by the reflector to the second surface so that the second surface emits light, and wherein the seventh inclined face is located between the fifth inclined face and the sixth inclined face.

9. The light guiding plate according to claim 1, wherein a plurality of cone-shaped recesses are formed in the second region, wherein each recess has the third and fourth inclined faces.

10. The light guiding plate according to claim 1, wherein the cell is a reflective type liquid crystal cell, wherein the light guiding plate is located on the observer's side of the liquid crystal cell and functions as a front light.

11. A light guiding plate for guiding light from a light source to illuminate a liquid crystal cell, the light guiding plate comprising:
- a reflector located on an opposite side of the plate from the light source, wherein the reflector reflects light from the light source;
- a first surface for selectively transmitting or reflecting light;
- a second surface, which is flat, located between the cell and the first surface, wherein the second surface selectively transmits or reflects light;
- a plurality of recesses located on the first surface at predetermined intervals, each recess including:
  - a first inclined face for reflecting light from the light source to the second surface so that the second surface emits light; and
  - a second inclined face for reflecting light reflected by the reflector to the second surface so that the second surface emits light; and
- a plurality of third inclined faces, which are located on the first surface, wherein each third inclined face is located between a pair of adjacent recesses and is inclined relative to the second surface.

12. The light guiding plate according to claim 11, wherein a first joint is located between each adjacent pair of the first and third inclined faces, wherein a second joint is located between each adjacent pair of the second and third inclined faces, and wherein the first joint is farther from the second surface than the second joint.

13. The light guiding plate according to claim 11, wherein a first joint is located between each adjacent pair of the first and third inclined faces, wherein a second joint is located between each adjacent pair of the second joint third inclined faces, and wherein the first joint is closer to the second surface than the second joint.

14. The light guiding plate according to claim 11, wherein the cell is a reflection type liquid crystal, wherein the light guiding plate is located on the observer's side of the liquid crystal cell and functions as a front light.

* * * * *

UNITED STATES PATENT AND TRADEMARK OFFICE
CERTIFICATE OF CORRECTION

PATENT NO.    : 6,607,279 B2
DATED         : August 19, 2003
INVENTOR(S)   : Eiki Niida et al.

It is certified that error appears in the above-identified patent and that said Letters Patent is hereby corrected as shown below:

Title page,
Item [56], References Cited, please insert the following:

-- U.S. PATENT DOCUMENTS 6,088,074    7/2000    Suzuki    362/31
    6,168,281    1/2001    Suzuki    362/31 --

Column 1,
Line 36, please delete "95" and insert therefore -- 951 --

Column 6,
Line 22, please delete "when" and insert therefore -- with --
Lines 41 and 57, please delete "1-3(D)" and insert therefore -- 1-3(B) --

Column 7,
Line 30, please delete "1-3(D)" and insert therefore -- 1-3(B) --

Figure 11:
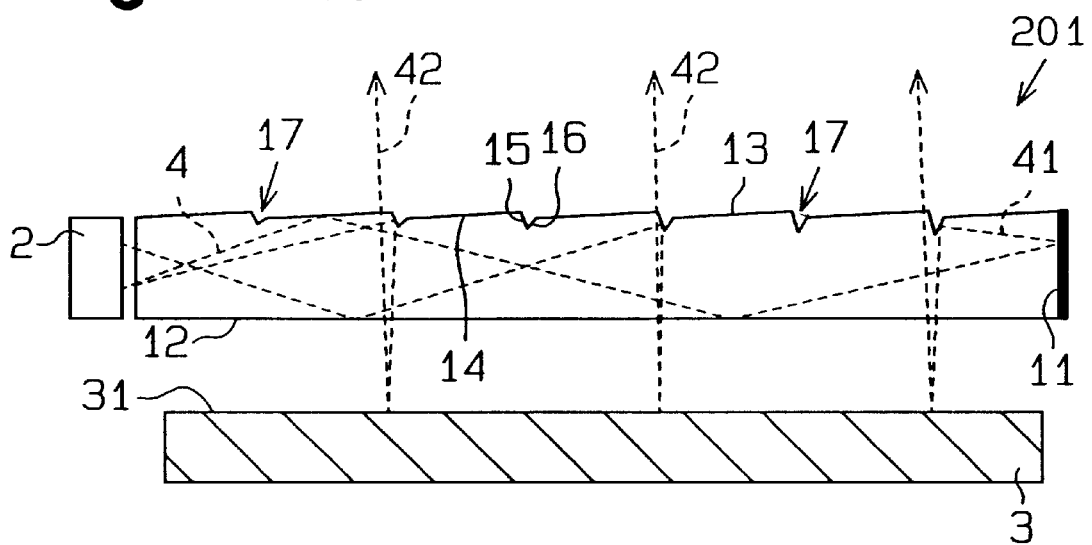
FIG. 11(A) is a cross-sectional view illustrating a light guiding plate according to a fifth embodiment of the present invention.
FIG. 11(B) is a cross-sectional view illustrating, a light guiding plate according to a sixth embodiment of the present invention.
Figure 11:
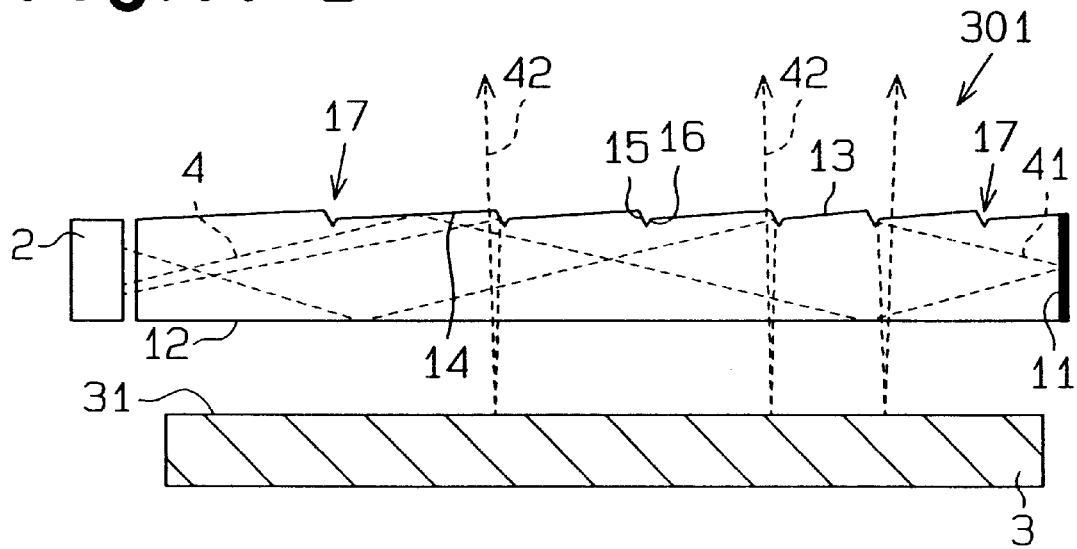

Column 8,
Line 5, please delete "is approximately 1 mm" and insert therefore -- 11 is located --
Lines 58-63, please delete paragraph and replace with
-- A light guiding plate 201 according to a fifth embodiment will be described with reference to Fig. 11 (A). The guiding plate 201 includes recesses 17. The depth of the recesses 17 increases as the distance from the light source 2 increases. The other structure of the light guiding plate 201 of Fig. 11(A) is the same as that shown in Figs. 8-10. --

Column 9,
Line 12, please delete "9" and insert therefore -- 8 --

UNITED STATES PATENT AND TRADEMARK OFFICE
CERTIFICATE OF CORRECTION

PATENT NO.    : 6,607,279 B2
DATED         : August 19, 2003
INVENTOR(S)   : Eiki Niida et al.

It is certified that error appears in the above-identified patent and that said Letters Patent is hereby corrected as shown below:

Column 11,
Line 9, please delete "1" and insert therefore -- 5 --

Signed and Sealed this

Thirteenth Day of July, 2004

JON W. DUDAS
*Acting Director of the United States Patent and Trademark Office*